United States Patent
Kwon

(10) Patent No.: US 8,928,434 B2
(45) Date of Patent: Jan. 6, 2015

(54) COMPLEX TUNER MODULE

(75) Inventor: Si Young Kwon, Seoul (KR)

(73) Assignee: Samsung Electro-Mechanics Co., Ltd., Suwon (KR)

(*) Notice: Subject to any disclaimer, the term of this patent is extended or adjusted under 35 U.S.C. 154(b) by 902 days.

(21) Appl. No.: 13/067,092

(22) Filed: May 6, 2011

(65) Prior Publication Data

US 2012/0174179 A1 Jul. 5, 2012

(30) Foreign Application Priority Data

Dec. 30, 2010 (KR) .................. 10-2010-0139024

(51) Int. Cl.
*H04B 1/08* (2006.01)
*H03J 1/00* (2006.01)
*H04N 21/426* (2011.01)
*H04N 5/44* (2011.01)
*H04N 21/418* (2011.01)

(52) U.S. Cl.
CPC ......... *H04N 21/4263* (2013.01); *H04N 5/4401* (2013.01); *H04N 21/418* (2013.01)
USPC ........................................... 334/85; 174/520

(58) Field of Classification Search
CPC ................................ H05K 9/006; H04B 1/08
USPC ................................ 334/85; 174/50–64
See application file for complete search history.

(56) References Cited

U.S. PATENT DOCUMENTS

| | | | | |
|---|---|---|---|---|
| 4,903,169 | A * | 2/1990 | Kitagawa et al. | 361/818 |
| 6,094,360 | A * | 7/2000 | Lange et al. | 361/799 |
| 6,731,518 | B2 * | 5/2004 | Suzuki et al. | 361/818 |
| 7,042,529 | B2 * | 5/2006 | Wakamori et al. | 348/836 |
| 7,289,167 | B2 * | 10/2007 | Yamamoto | 348/731 |
| 7,831,198 | B2 * | 11/2010 | Kishida et al. | 455/3.02 |
| 2009/0161324 | A1 * | 6/2009 | Sakamoto et al. | 361/728 |
| 2009/0211800 | A1 * | 8/2009 | Tsao et al. | 174/377 |

FOREIGN PATENT DOCUMENTS

| | | |
|---|---|---|
| JP | 2004-336159 | 11/2004 |
| JP | 2006-303374 | 11/2006 |
| KR | 10-2003-0094596 | 12/2003 |
| KR | 10-2010-0096947 | 9/2010 |

OTHER PUBLICATIONS

Korean Office Action mailed Jun. 11, 2012 issued in corresponding Korean Patent Application No. 10-2010-0139024.
Korean Office Action mailed Dec. 26, 2012 in corresponding Korean Patent Application No. 10-2010-0139024.

* cited by examiner

*Primary Examiner* — Dean O Takaoka
*Assistant Examiner* — Alan Wong

(57) ABSTRACT

There is provided a complex tuner module including a plurality of tuner chips through which users may simultaneously view and record a plurality of channels. The complex tuner module includes: a module substrate having a plurality of tuner chips mounted thereon; and a chassis part connected to the module substrate and having a plurality of blocking sidewalls disposed in spaces between the tuner chips to thereby block interference between the tuner chips.

13 Claims, 4 Drawing Sheets

COMPLEX TUNER MODULE

CROSS-REFERENCE TO RELATED APPLICATIONS

This application claims the priority of Korean Patent Application No. 10-2010-0139024 filed on Dec. 30, 2010, in the Korean Intellectual Property Office, the disclosure of which is incorporated herein by reference.

BACKGROUND OF THE INVENTION

1. Field of the Invention

The present invention relates to a complex tuner module used in a television (TV) or a set-top box, and more particularly, to a complex tuner module through which users may simultaneously view and record a plurality of television channels.

2. Description of the Related Art

Digital broadcasting may be divided into terrestrial broadcasting using a terrestrial wave or a cable and satellite broadcasting using a satellite wave. Therefore, in the case of a tuner receiving a broadcasting signal, a terrestrial tuner and a satellite tuner are separately manufactured and used.

According to the related art, a method in which a single TV (or a set-top box) receives and uses only any one of a terrestrial wave and a satellite wave has mainly been used. However, in accordance with customer demand, a technology for receiving both a terrestrial wave and a satellite wave in a TV (or a set-top box) by mounting the respective terrestrial wave and the satellite wave receiving tuner chips together in a signal tuner module has been recently developed.

However, in a case in which a plurality of tuner chips are mounted in a single module as described above, interference is caused between the individual tuner chips, influencing TV image reception quality, thereby deteriorating the image reception quality.

In addition, this problem is further intensified in the case in which further tuner chips (for example, four tuner chips) are mounted in the single module. Therefore, a complex tuner module having a structure allowing for the shielding of interference between the tuner chips is in demand.

SUMMARY OF THE INVENTION

An aspect of the present invention is to provide a complex tuner module including a plurality of tuner chips through which users may simultaneously view and record a plurality of television channels.

Another aspect of the present invention is to provide a complex tuner module allowing for the shielding of interference between a plurality of tuner chips.

According to an aspect of the present invention, there is provided a complex tuner module including: a module substrate having a plurality of tuner chips mounted thereon; and a chassis part connected to the module substrate and having a plurality of blocking sidewalls disposed in spaces between the tuner chips to thereby block interference between the tuner chips.

The module substrate may have blocking holes formed in the spaces between the tuner chips, the blocking holes corresponding to the tuner chips and having a through hole shape.

The blocking sidewalls may be insertedly disposed in the blocking holes.

Two of the blocking sidewalls may be insertedly disposed in one of the blocking holes.

The blocking sidewalls may be disposed to penetrate through the blocking holes and partially protrude downwardly of the module substrate.

The chassis part may further include an outer sidewall formed along an edge of the module substrate and having a signal input terminal connected to one end thereof.

The chassis part may have at least one fixing pin formed on a lower end thereof in a protruding manner, and the fixing pin may be fixedly coupled to the module substrate and be electrically connected to a ground electrode of the module substrate.

The chassis part may include: at least one first chassis receiving at least one tuner chip therein and including at least one blocking sidewall; and a second chassis receiving the first chassis therein and including at least one blocking sidewall disposed in parallel with the blocking sidewall of the first chassis.

The chassis part may include: a seating part disposed in parallel with the module substrate and having a cover seated on an upper portion thereof; and a plurality of sidewalls bent from the seating part and serving as columns between the cover and the module substrate.

The seating part and the sidewalls may be formed by punching a flat steel plate using a press apparatus and then bending the steel plate.

The module substrate may include: a distributing part distributing signals input from the outside; a tuning part including the plurality of tuner chips and tuning the signals input from the distributing part; and a demodulating part demodulating the signals input from the tuning part.

The distributing part may include a plurality of distributing parts, and the blocking sidewalls may be further disposed in spaces between the plurality of distributing parts.

The complex tuner module may further include a cover covering an outer surface of the chassis part and blocking an electromagnetic wave coming from the outside.

The plurality of tuner chips may include a plurality of terrestrial tuner chips and a plurality of satellite tuner chips.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
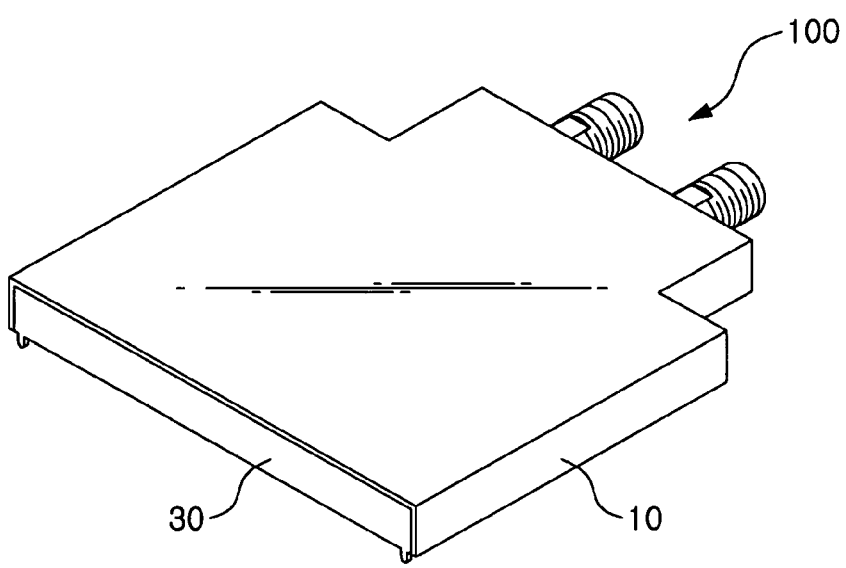
FIG. 1 is a schematic perspective view of a complex tuner module according to an exemplary embodiment of the present invention.

Prior to a detailed description of the present invention, the terms or words, which are used in the specification and claims to be described below, should not be construed as having typical or dictionary meanings. The terms or words should be construed in conformity with the technical idea of the present invention on the basis of the principle that the inventor(s) can appropriately define terms in order to describe his or her invention in the best way. Embodiments described in the specification and structures illustrated in drawings are merely exemplary embodiments of the present invention. Thus, it is intended that the present invention covers the modifications and variations of this invention, provided they fall within the scope of their equivalents at the time of filing this application.

Exemplary embodiments of the present invention will be described in detail with reference to the accompanying drawings. The same reference numerals will be used throughout to designate the same or like elements in the accompanying drawings. Moreover, detailed descriptions related to well-known functions or configurations will be ruled out in order not to unnecessarily obscure subject matters of the present invention. In the drawings, the shapes and dimensions of some elements may be exaggerated, omitted or schematically illustrated. Also, the size of each element does not entirely reflect an actual size.

Figure 2:
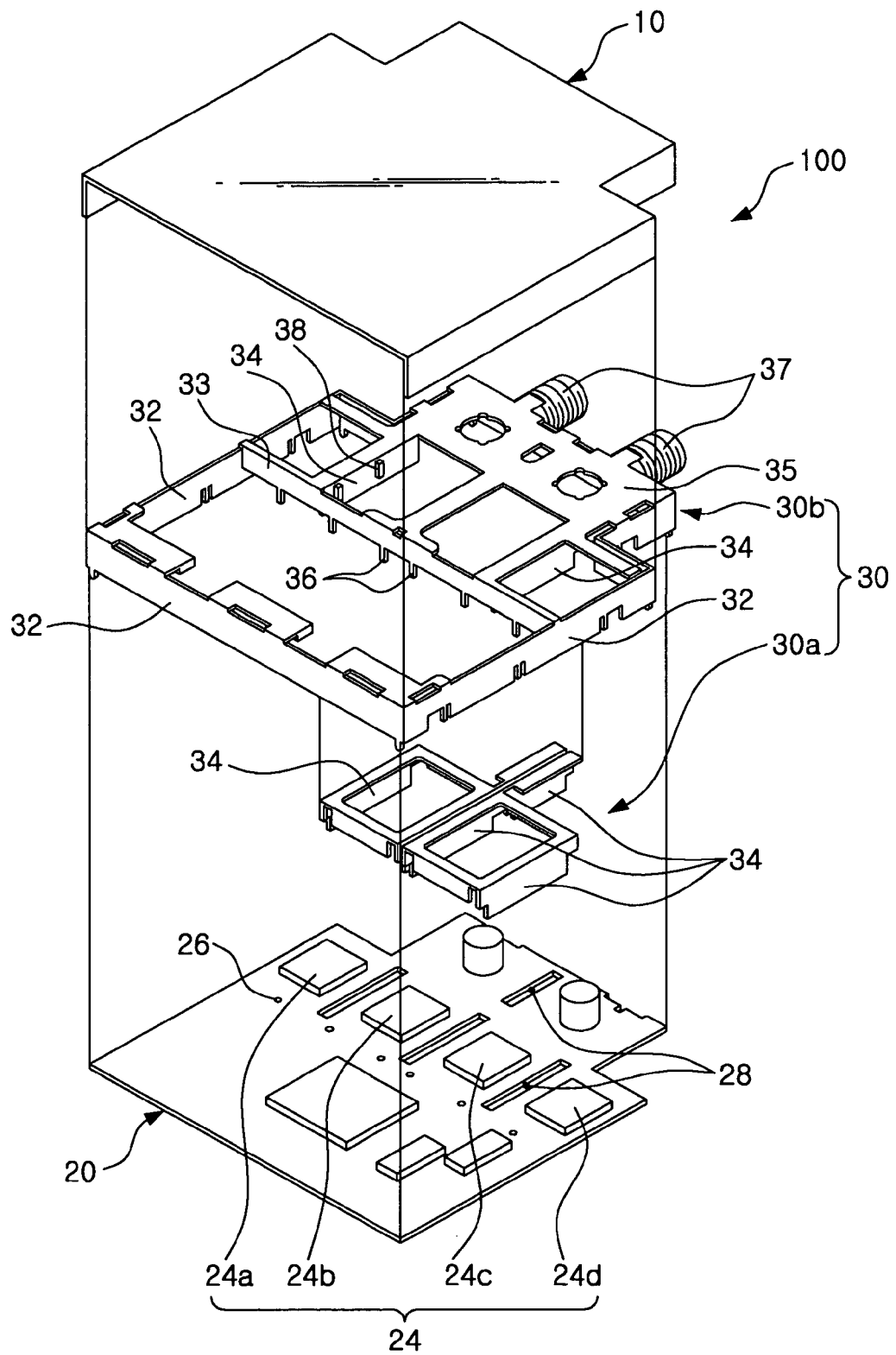
FIG. 2 is an exploded perspective view of the complex tuner module shown in FIG. 1.
Figure 3:
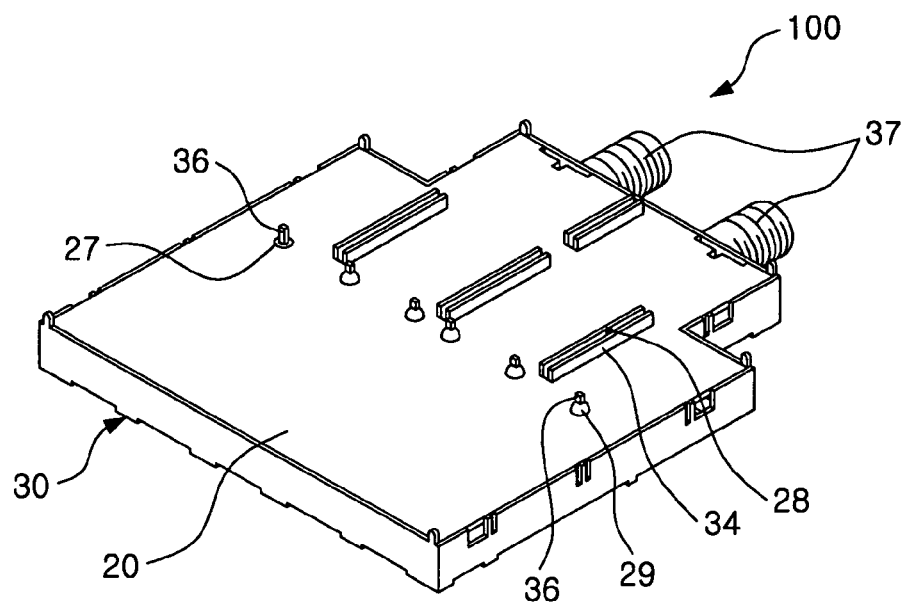
FIG. 3 is a schematic perspective view showing the bottom of the complex tuner module shown in FIG. 1.

FIG. 1 is a schematic perspective view of a complex tuner module according to an exemplary embodiment of the present invention; FIG. 2 is an exploded perspective view of the complex tuner module shown in FIG. 1; and FIG. 3 is a schematic perspective view showing the bottom of the complex tuner module shown in FIG. 1.

Figure 4:
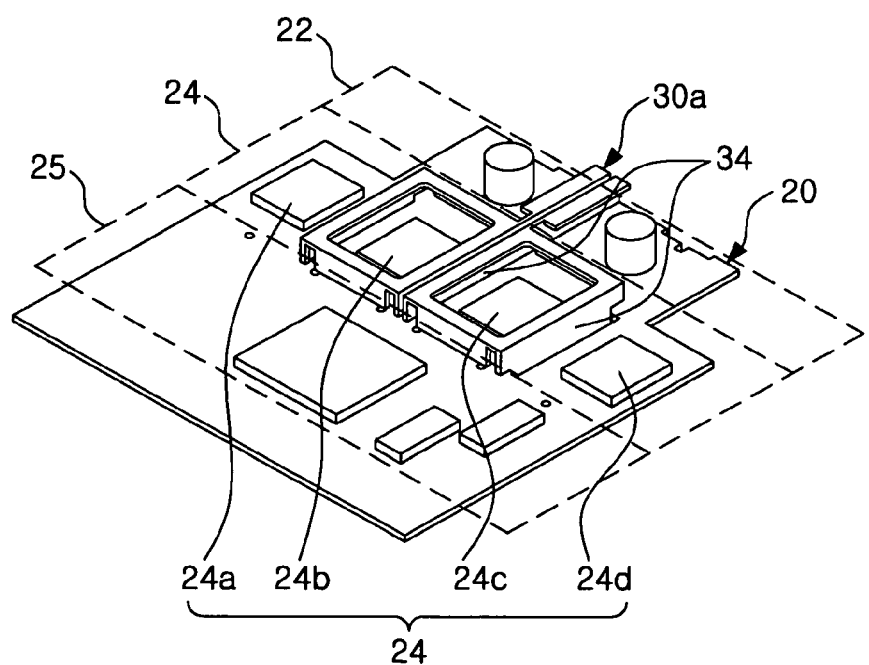
FIG. 4 is a perspective view showing a structure in which a module substrate and a first chassis are combined with each other according to an exemplary embodiment of the present invention.
Figure 5:
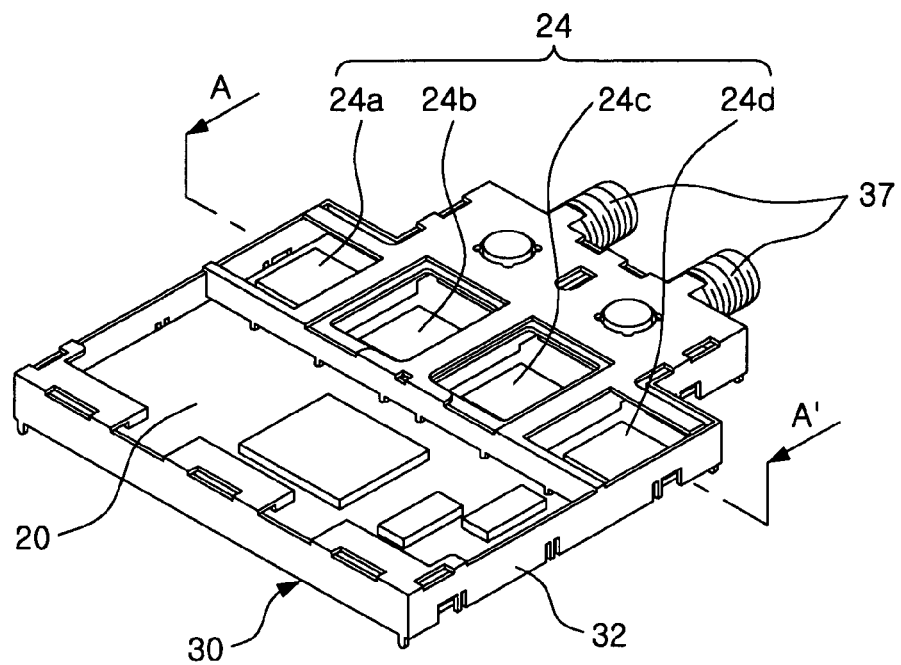
FIG. 5 is a schematic perspective view showing a structure in which a module substrate and a chassis part are combined with each other according to an exemplary embodiment of the present invention.
Figure 6:
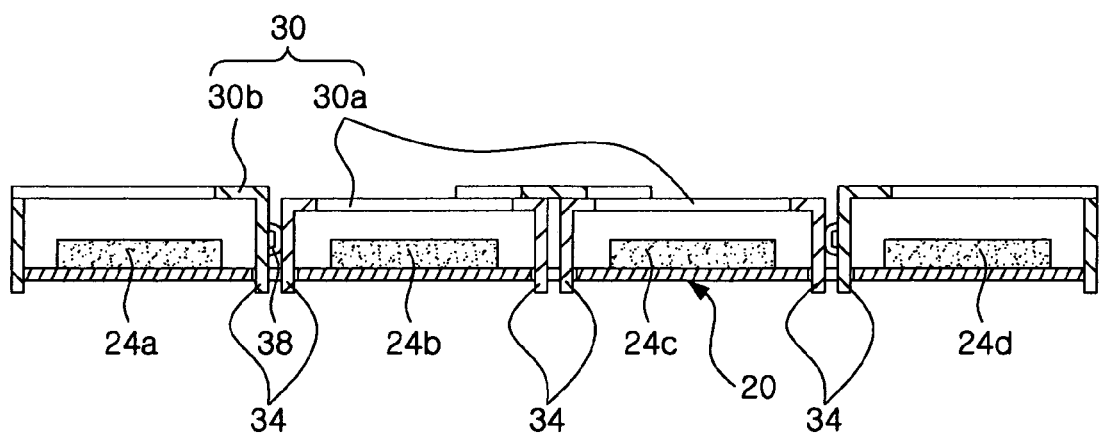
FIG. 6 is a cross-sectional view taken along line A-A' of FIG. 5.

In addition, FIG. 4 is a perspective view showing a structure in which a module substrate and a first chassis are combined with each other according to an exemplary embodiment of the present invention; FIG. 5 is a schematic perspective view showing a structure in which a module substrate and a chassis part are combined with each other according to an exemplary embodiment of the present invention; and FIG. 6 is a cross-sectional view taken along line A-A' of FIG. 5.

Referring to FIGS. 1 through 6, a complex tuner module 100 according to an exemplary embodiment of the present invention is configured to include a module substrate 20, a chassis part 30, and a cover 10.

An upper surface of the module substrate 20 may be provided with mounting electrodes for mounting electronic components thereon with circuit patterns electrically interconnecting the mounting electrodes. The module substrate 20 may be a multi-layer substrate formed as a plurality of layers, and circuit patterns 12 for electrical connections may be formed between each of the plurality of layers.

In addition, the module substrate 20 according to an exemplary embodiment of the present invention may include a distributing part 22, a tuning part 24, and a demodulating part 25 that are formed on one surface thereof, as shown in FIG. 4.

The distributing part 22 is electrically connected to a signal input terminal 37 to be described below to thereby distribute signals input from the outside on a plurality of paths. In the present embodiment of the invention, two signal input terminals 37 are provided. Therefore, two distributing parts 22 are provided to thereby be connected to the respective signal input terminals 37.

The tuning part 24 tunes the signals transferred from the distributing part 22. To this end, the tuning part 24 includes a plurality of tuner chips 24a, 24b, 24c, and 24d. The complex tuner module 100 according to this embodiment of the invention includes a total of four tuner chips 24a, 24b, 24c, and 24d such that users may view and record various broadcasts in a complex manner. More specifically, the complex tuner module 100 according to the present embodiment may include two terrestrial tuner chips 24a and 24b and two satellite tuner chips 24c and 24d.

The demodulating part 25 demodulates the signals transmitted from the tuning part 24 in a preset scheme. The demodulating part 25 may include a SAW filter allowing only preset band signals to pass therethrough as needed. In addition, the demodulating part 25 according to the present embodiment may include a plurality of demodulating chips, corresponding to the respective tuner chips 24a, 24b, 24c, and 24d. However, the present invention is not limited thereto. A single demodulating chip may be used if it may perform demodulation on the signals transmitted from the plurality of tuner chips 24a, 24b, 24c, and 24d.

These tuner chips 24a, 24b, 24c, and 24d and demodulating chips may be formed as integrated circuit (IC) chips, and may be manufactured through a separate chip manufacturing process and be mounted on the module substrate 20.

In addition, the module substrate 20 according to an exemplary embodiment of the present invention includes a plurality of through holes 26 and blocking holes 28 to which chassis 30a and 30b are insertedly coupled as will be described below.

Referring to FIG. 3, the through holes 26 have fixing pins 36 of the chassis part 30 inserted thereinto and fixedly connected thereto. Therefore, the through holes 26 are formed corresponding to positions in which the fixing pins 36 of the chassis part 30 are disposed. In addition, as shown in FIG. 3, ground electrodes 27 may be formed around outer circumferential surfaces of the through holes 26 in a lower surface of the module substrate 20. The ground electrodes 27 are electrically and physically connected to the fixing pins 36 of the chassis part 30 through a solder bonding part 29.

The blocking holes 28 are formed as holes penetrating through the module substrate 20 in spaces between the tuner chips 24a, 24b, 24c, and 24d as described above. The blocking holes 28 are used to minimize interference between the tuner chips 24a, 24b, 24c, and 24d. A detailed description thereof will be provided below.

The module substrate 20 according to the present embodiment has the plurality of tuner chips 24a, 24b, 24c, and 24d mounted thereon. Here, the tuner chips 24a, 24b, 24c, and 24d are disposed in a row so as to be spaced apart from each other by a predetermined interval on the module substrate 20.

For example, in a case in which the tuner chip 24a is disposed adjacent to the other tuner chip 24b, an electromagnetic wave, noise, or the like, generated at the time of the driving of the tuner chip 24a may be transferred to the adjacent tuner chip 24b through the circuit pattern of the module substrate 20.

In order to solve this problem, the module substrate 20 according to the present embodiment includes the blocking hole 28 in the space between the adjacent tuner chips 24a and 24b. Therefore, a direct path of the signal interference generated through the module substrate 20 between the two adjacent tuner chips 24a and 24b is blocked by the blocking hole 28. In this manner, the signal interference generated between the tuner chips 24a, 24b, 24c, and 24d may be minimized.

This interference may also be generated between the two distributing parts 22 disposed adjacently to each other. Therefore, the module substrate 20 according to this embodiment of the invention also includes the blocking hole 28 formed in a space between the two distributing parts 22.

Therefore, the module substrate 20 according to the present embodiment includes three blocking holes 28 formed between the four tuner chips 24a, 24b, 24c, and 24d and one blocking hole 28 formed between the two distributing parts 22.

However, the module substrate 20 according to the exemplary embodiment of the present invention is not limited to the above-mentioned structure. That is, a plurality of blocking holes having various shapes may be formed according to the positions of the tuner chips 24a, 24b, 24c, and 24d and the distributing parts 22.

The chassis part 30 is interposed between the cover 10 to be described below and the module substrate 20 to thereby support the cover 10.

In addition, the chassis part 30 includes the signal input terminals 37 connected to external signal lines, a seating part 35 disposed in parallel with the module substrate 20 and having the cover 10 seated on an upper surface thereof, and a plurality of sidewalls bent from the seating part 35 and serving as columns between the cover 10 and the module substrate 20.

The two signal input terminals 37 are provided corresponding to the number of the distributing parts 22, and are connected to protrude outwardly from an outer sidewall 32 of the chassis part 30. As the signal input terminal 37, a generally known signal input terminal may be used. Therefore, a detailed description thereof will be omitted.

The sidewalls include the outer sidewall 32, and blocking sidewalls 34 formed in order to block electromagnetic wave interference between the tuner chips 24a, 24b, 24c, and 24d.

The outer sidewall 32 forms outer side surfaces of the chassis part 30. Therefore, the outer sidewall 32 is formed along an edge of the module substrate 20, and has the signal input terminals 37 connected to one end thereof.

The blocking sidewalls 34 are formed in order to block the spaces between the plurality of tuner chips 24a, 24b, 24c, and 24d and the distributing parts 22, as described above. Therefore, the blocking sidewalls 34 are disposed along the spaces between the tuner chips 24a, 24b, 24c, and 24d and the distributing parts 22. However, the present invention is not limited thereto. The blocking sidewalls 34 may be further formed as needed.

In addition, according to the present embodiment of the invention, the two blocking sidewalls 34 are disposed in the respective disposition spaces in parallel with each other to be spaced apart from each other by a predetermined distance. Therefore, the blocking sidewalls 34 are doubly disposed in the spaces between the tuner chips 24a, 24b, 24c, and 24d and the distributing parts 22.

Therefore, the generation of electromagnetic wave interference between chips disposed adjacently to each other may be more effectively blocked.

In addition, the blocking sidewalls 34 according to this embodiment may have lower ends inserted into the blocking hole 28 of the module substrate 20, as shown in FIG. 3. That is, the two blocking sidewalls 34 are insertedly disposed in a single blocking hole 28.

In addition, the blocking sidewalls 34 are disposed to penetrate through the blocking hole 28 and partially protrude downwardly of the module substrate 20. Therefore, the complex tuner module 100 according to this embodiment of the invention may also effectively block electromagnetic wave interference generated through spaces between the blocking sidewalls 34 and module substrate 20.

The chassis part 30 according to this exemplary embodiment of the present invention having the above-mentioned configuration may be formed by punching a flat steel plate in a predetermined shape using a press apparatus (not shown) and then bending it. Therefore, the chassis part 30 may include the seating part 35 and the sidewalls 32, 33, and 34 bent downwardly from the seating part 35.

Meanwhile, the chassis part 30 according to the present embodiment includes the blocking sidewalls 34 formed between the four tuner chips 24a, 24b, 24c, and 24d and the two distributing parts 22.

However, in the case in which the chassis part 30 is formed by pressing the steel plate as described above, it is difficult to form the above-mentioned double blocking sidewalls 34 using a single steel plate.

To this end, the chassis part 30 according to the exemplary embodiment of the invention may include a first chassis 30a including the blocking sidewalls 34 and a second chassis 30b.

The first chassis 30a may be provided in plural. In this exemplary embodiment, a pair of first chassis is disposed in parallel with each other on the module substrate 20, as shown in FIGS. 2 and 6. Here, the first chassis 30a is disposed on the module substrate 20 in a manner such that it encloses the internally disposed two tuner chips 24b and 24c among the four tuner chips 24a, 24b, 24c, and 24d.

In addition, the pair of first chassis 30a is formed to have a shape corresponding to those of the respective tuner chips 24b and 24c. In the present embodiment of the invention, the first chassis 30a is formed to have a rectangular shape. However, the present invention is not limited thereto.

The first chassis 30a includes the blocking sidewalls 34 formed at both sides thereof in a longitudinal direction. In addition, when the first chassis 30a according to the present embodiment is seated on the module substrate 20, the blocking sidewalls 34 facing each other are extended to protrude outwardly. Here, the extended parts are disposed between the distributing parts 22.

Therefore, when the first chassis 30a is seated on and coupled to the module substrate 20, the blocking sidewalls 34 are doubly formed between the internally disposed two tuner chips 24b and 24c among the four tuner chips 24a, 24b, 24c, and 24d and between the distributing parts 22, as shown in FIG. 4.

The second chassis 30b includes the above-mentioned outer sidewall 32. In addition, the second chassis 30b may include the inner sidewall 33 in order to be easily coupled to the first chassis 30a.

Here, the inner sidewall 33 contacts the sidewalls of the first chassis 30a and serves to fix the first chassis 30a to an inner portion of the second chassis 30b. To this end, the inner sidewall 33 and the sidewalls of the first chassis 30a have a protrusion, a groove, or the like, formed on both opposite surfaces thereof to thereby be inserted into and coupled to each other.

In addition, the outer sidewall 32 and the inner sidewall 33 of the second chassis 30b have the fixing pins 36 on lower ends thereof, wherein the fixing pins 36 protruding therefrom are inserted into the through holes 26 of the module substrate 20. The fixing pins 36 are fixedly coupled to the module substrate 20 through soldering, or the like, to be electrically and physically connected to the ground electrodes 27 of the module substrate 20, as described above.

In addition, the second chassis 30b according to this exemplary embodiment includes the blocking sidewalls 34, similar to the first chassis 30a. In the case of the second chassis 30b, the blocking sidewalls 34 are formed to correspond to portions at which the double blocking sidewalls 34 are not formed by the first chassis 30a. That is, two blocking sidewalls 34 are formed at positions corresponding to the outer side surfaces of the first chassis 30a, as shown in FIG. 2.

When the second chassis 30b is seated on the module substrate 20, the first chassis 30a is received in the inner portion of the second chassis 30b and is coupled to the second chassis 30b. In addition, as shown in FIG. 6, the double blocking sidewalls 34 are formed between the spaces between the individual tuner chips 24a, 24b, 24c, and 24d and the space between the distributing parts 22.

Meanwhile, in the chassis part 30 according to the exemplary embodiment of the present invention, the double blocking sidewalls 34 are disposed to be spaced apart from each other by a predetermined interval, as described above. To this end, at least one of the double blocking sidewalls 34 facing each other may have at least one spacing protrusion 38 formed thereon, the spacing protrusion protruding by a predetermined distance and allowing the double blocking sidewalls 34 to be spaced apart from each other. Therefore, the double blocking sidewalls 34 may maintain the predetermined distance therebetween.

The cover 10 covers an outer portion of the chassis part 30 and protects electronic components mounted on the module substrate 20 from the outside. In addition, the cover 10 shields electromagnetic waves coming from the outside.

The complex tuner module 100 according to the exemplary embodiment of the present invention configured as described above includes the plurality of tuner chips 24a, 24b, 24c, and 24d formed on a single module substrate 20. Therefore, various broadcasts may be viewed and recorded in a complex manner.

In addition, the complex tuner module 100 according to the exemplary embodiment of the present invention has the blocking holes 28 formed in the spaces between the plurality of chips. Therefore, the direct path of the signal interference generated through the module substrate 20 between the two adjacent tuner chips is blocked, whereby the signal interference generated between the adjacent tuner chips 24a, 24b, 24c, and 24d may be minimized.

In addition, the complex tuner module 100 according to the exemplary embodiment of the present invention includes the double blocking sidewalls 34 disposed in the spaces between the tuner chips 24a, 24b, 24c, and 24d and the distributing parts 22. Therefore, electromagnetic wave interference between adjacent chips may be effectively blocked.

Meanwhile, the complex tuner module according to the present invention is not limited to the above-mentioned exemplary embodiments, but various modifications may be made by those skilled in the art without departing from the spirit and scope of the present invention.

For example, the above-mentioned exemplary embodiments have been described as a case in which the four tuner chips are mounted on the module substrate; however, the present invention is not limited thereto. If necessary, more tuner chips (or distributing parts) may be mounted on the module substrate.

In addition, the above-mentioned exemplary embodiments have been described as a case in which the chassis part is formed by pressing the steel plate, such that it is configured of the first and second chassis by way of example. However, the present invention is not limited thereto. The chassis part may be formed to have various shapes, such as the usage of a single chassis, a combination of three or more chassis, or the like, if it may allow for the formation of the double blocking sidewalls between the tuner chips.

In addition, the above-mentioned exemplary embodiments have described a tuner for receiving a television (TV) signal by way of example; however, the present invention is not limited thereto, and may be widely applied to a module including a plurality of chips formed on a substrate and having interference generated between these chips.

What is claimed is:

1. A complex tuner module comprising:
   a module substrate having a plurality of tuner chips mounted thereon; and
   a chassis part connected to the module substrate and having a plurality of blocking sidewalls disposed in spaces between the plurality of tuner chips to block interference between the plurality of tuner chips, the chassis part including:
   at least one first chassis to receive at least one tuner chip of the plurality of tuner chips therein, and the at least one first chassis including at least one blocking sidewall, and
   a second chassis to receive the first chassis therein, and the second chassis including at least one blocking sidewall disposed in parallel with the at least one blocking sidewall of the at least one first chassis.

2. The complex tuner module of claim 1, wherein the module substrate has blocking holes formed in the spaces between the plurality of tuner chips, the blocking holes corresponding to the plurality of tuner chips and having a through hole shape.

3. The complex tuner module of claim 2, wherein the plurality of blocking sidewalls are insertedly disposed in the blocking holes.

4. The complex tuner module of claim 3, wherein the blocking sidewalls are disposed to penetrate through the blocking holes and partially protrude downwardly of the module substrate.

5. The complex tuner module of claim 1, wherein the chassis part further includes an outer sidewall formed along an edge of the module substrate and having a signal input terminal connected to one end thereof.

6. The complex tuner module of claim 5, wherein the chassis part has at least one fixing pin formed on a lower end thereof in a protruding manner, and the fixing pin is fixedly coupled to the module substrate and is electrically connected to a ground electrode of the module substrate.

7. The complex tuner module of claim 1, wherein the chassis part includes:
   a seating part disposed in parallel with the module substrate and having a cover seated on an upper portion thereof; and
   a plurality of sidewalls bent from the seating part and serving as columns between the cover and the module substrate.

8. The complex tuner module of claim 7, wherein the seating part and the plurality of sidewalls are formed by punching a flat steel plate using a press apparatus and then bending the steel plate.

9. The complex tuner module of claim 1, wherein the module substrate includes:
   a distributing part to distribute signals input from the outside;
   a tuning part including the plurality of tuner chips, and the tuning part is configured to tune the signals input from the distributing part; and
   a demodulating part to demodulate the signals input from the tuning part.

10. The complex tuner module of claim 9, wherein the distributing part comprises a plurality of distributing parts, and
   the blocking sidewalls are further disposed in spaces between the plurality of distributing parts.

11. The complex tuner module of claim 1, further comprising a cover covering an outer surface of the chassis part and blocking an electromagnetic wave coming from the outside.

12. The complex tuner module of claim 1, wherein the plurality of tuner chips includes a plurality of terrestrial tuner chips and a plurality of satellite tuner chips.

13. A complex tuner module comprising:
- a module substrate having a plurality of tuner chips mounted thereon; and
- a chassis part connected to the module substrate and having a plurality of blocking sidewalls disposed in spaces between the plurality of tuner chips to block interference between the plurality of tuner chips,
- the module substrate having blocking holes formed in the spaces between the plurality of tuner chips, the blocking holes corresponding to the plurality of tuner chips, and the blocking holes haying a through hold shape, and
- two of the blocking sidewalls of the plurality of blocking sidewalls are insertedly disposed in one of the blocking holes.

\* \* \* \* \*

UNITED STATES PATENT AND TRADEMARK OFFICE
CERTIFICATE OF CORRECTION

PATENT NO. : 8,928,434 B2
APPLICATION NO. : 13/067092
DATED : January 6, 2015
INVENTOR(S) : Si Young Kwon et al.

It is certified that error appears in the above-identified patent and that said Letters Patent is hereby corrected as shown below:

In the Claims

Column 9, line 14, in claim 13, delete "haying" and insert -- having --, therefor.
Column 9, line 14, in claim 13, delete "hold" and insert -- hole --, therefor.

Signed and Sealed this
Seventh Day of July, 2015

Michelle K. Lee
*Director of the United States Patent and Trademark Office*